United States Patent [19]

Miller

[11] Patent Number: 4,503,349
[45] Date of Patent: Mar. 5, 1985

[54] SELF-EXCITED HIGH CURRENT DC ELECTRICAL PULSE GENERATOR

[75] Inventor: Henry W. Miller, Saratoga, Calif.

[73] Assignee: Westinghouse Electric Corp., Pittsburgh, Pa.

[21] Appl. No.: 518,337

[22] Filed: Jul. 29, 1983

[51] Int. Cl.³ .......................................... H02K 31/00
[52] U.S. Cl. ......................................... 310/178; 310/46; 310/114; 310/148; 310/177
[58] Field of Search ............... 310/178, 210, 232, 113, 310/114, 168, 177, 170, 171, 198, 102 R, 102 A, 154, 148, 206, 207, 46; 318/253; 322/48

[56] References Cited

U.S. PATENT DOCUMENTS

| 3,513,340 | 5/1970 | Appleton | 310/113 |
| 3,539,852 | 11/1970 | Appleton | 310/178 |
| 3,590,295 | 6/1971 | Appleton | 310/178 |
| 3,639,793 | 2/1972 | Appleton | 310/178 |
| 3,646,394 | 2/1972 | Swartz | 310/178 |
| 3,870,914 | 3/1975 | Walker | 310/219 |
| 4,034,248 | 7/1977 | Mole | 310/178 |
| 4,041,337 | 8/1977 | Mole | 310/178 |
| 4,071,794 | 1/1978 | Schoen | 310/154 |
| 4,088,911 | 5/1978 | Wetzig | 310/178 |
| 4,110,648 | 8/1978 | Stillwagon | 310/178 |
| 4,271,369 | 6/1981 | Stillwagon | 310/178 |
| 4,276,507 | 6/1981 | Stillwagon | 322/48 |

FOREIGN PATENT DOCUMENTS

| 0571443 | 8/1945 | United Kingdom | 310/178 |
| 1240498 | 7/1971 | United Kingdom | 310/178 |
| 1298935 | 12/1972 | United Kingdom | 310/178 |
| 0048101 | 1/1981 | U.S.S.R. | 310/178 |

Primary Examiner—R. Skudy
Attorney, Agent, or Firm—R. P. Lenart

[57] ABSTRACT

Homopolar generators are provided with a helical field coil disposed around a rotor, wound coaxially with the rotor, and connected in series with sliding electrical contacts on the rotor. The coil of a single rotor machine includes two sections wound so as to increase magnetic flux through the rotor when current is allowed to flow through an external circuit and through the coil and brushes. For a dual counterrotating rotor machine, a single section coil is used to perform the same function.

15 Claims, 3 Drawing Figures

SELF-EXCITED HIGH CURRENT DC ELECTRICAL PULSE GENERATOR

BACKGROUND AND SUMMARY OF THE INVENTION

This invention relates to homopolar generators and more particularly to such generators in which the stator field coil is connected in series with the brushes to limit initial current rise and to prolong output current pulse duration.

Homopolar generators have been successfully designed for providing short duration pulses having a peak current level in excess of a million amperes DC. Such generators generally include a cylindrical rotor of either a drum or disc configuration, mounted on frame, and rotated about an axis through the center of the cylinder. A field coil encircling the rotor and connected to an external current supply provides an applied field excitation passing through the rotor. The applied field excitation is usually confined and directed by a ferromagnetic yoke surrounding the field coil and all, or a portion of, the rotor. When the rotor is spinning, the free electrons within the rotor experience an electromotive force resulting from their interaction with the applied field excitation. Brushes, positioned inside the field coil or between two halves of the field coil, are then lowered onto the spinning rotor to allow an electrical current to flow under the influence of such electromotive force through return conductors to an external circuit, and then back onto the rotor through additional brushes at a different location. During the discharge, the interaction of the discharge current in the applied field excitation creates a force which decelerates the rotor until its rotation stops and the discharge therefore ends. It has been found, that extremely high current pulses may be obtained after using a relatively low power conventional prime mover or a conventional low voltage, low amperage power source to store initial energy in the rotor by gradually motoring the rotor up to the desired rotational speed.

Homopolar generators have been found to be useful in electromagnetic projectile launching systems wherein a high current power source comprising the series connection of a homopolar generator and an inductive energy storage coil is connected to a pair of conductive projectile launching rails. A sliding conductive armature is positioned between the rails such that when current is switched from the high current power source to the rails, current flow in the rails and through the armature places an electromagnetic force on the armature which propels it along the rails. Electromagnetic launching systems have been constructed which use a compensated winding, shunt field excited homopolar generator which has very low impedance in series with an air core toroidal inductor to supply current to a parallel rail launcher. Where a large payload, such as a manned aircraft, is to be launched, it is desired to have a gradual buildup of acceleration which has a duration of several seconds. For such an application, the series connection of an air core toroidal inductor and a homopolar generator becomes unwieldy because of the size of the inductor required to limit the initial current rise and to prolong the pulse duration. This invention surmounts this problem by combining the function of the toroidal inductor and the homopolar generator into a single unit. The field of the coil is thereby used to provide the field of the homopolar generator. This also minimizes the external field power supply requirements. By proper design of the time constant of the series field coil, it is possible to provide a slow buildup in the field flux and armature current, thus providing a controlled current buildup and an improved ratio of effective to peak current. By providing a permanent magnet or auxiliary pilot winding to augment initial residual flux, it will be possible to minimize or eliminate the need for an external power supply.

This invention is a self-excited, high current, DC pulse generator that will require a minimum of external supporting equipment. A pulse generator constructed in accordance with this invention comprises: a stator member; a rotor concentrically positioned within the stator member and mounted for relative rotation therewith; a main stator winding including two winding sections which encircle the rotor and are helically wound and coaxial with the rotor, wherein the winding sections are electrically connected in series with each other; a pair of brushes disposed in sliding contact with the rotor, mounted on opposite sides of the main stator winding, and electrically connected to opposite ends of the main stator windings; a third brush disposed in sliding electrical contact with the rotor and mounted at an intermediate position on the rotor between the first pair of brushes; and means for rotating the rotor. An external load can be connected between the third brush and the common point of the two winding sections.

This invention also encompasses a dual rotor electric pulse generator comprising: a stator member; first and second rotors positioned within the stator member and mounted for rotation in opposite directions about a common axis relative to the stator member; a main stator winding being helically wound and coaxial with the rotors; first and second brushes disposed in sliding electrical contact with the first rotor and mounted at axially displaced locations along the first rotor, wherein the second brush is connected to one end of the main stator winding; third and fourth brushes disposed in sliding electric contact with the second rotor and mounted at axially displaced locations along the second rotor, wherein the third brush is connected to the other end of the main stator winding; and means for rotating the first and second rotors. In a dual rotating drum generator in accordance with this invention, an external load is connected between the first and fourth brushes. The rotors of both the single rotor and the dual rotor generators can be rotated by way of connection to an external driving means, or by being motored up by connection to an external power source while the rotors are in the presence of a magnetic field.

DESCRIPTION OF THE PREFERRED EMBODIMENT

Figure 1:
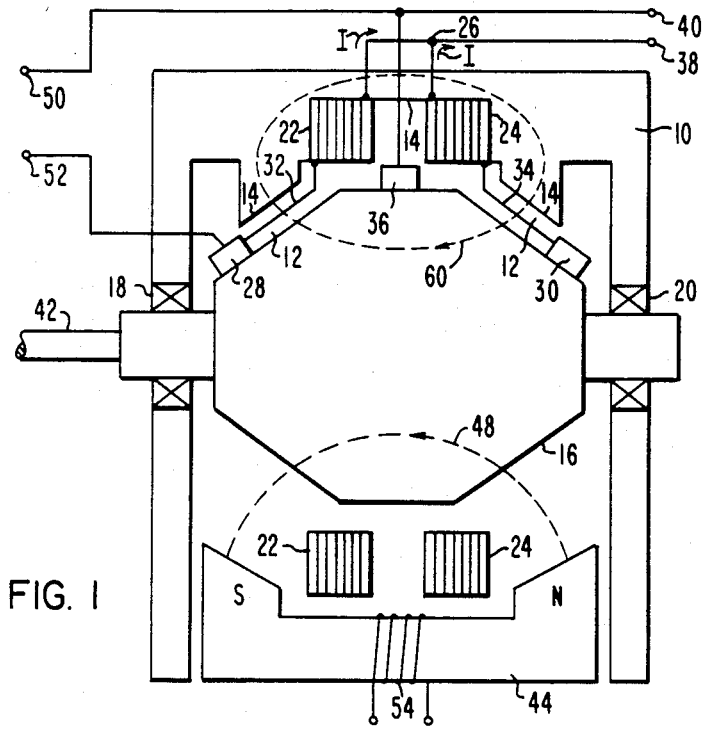
FIG. 1 is a plan view of a homopolar generator constructed in accordance with one embodiment of this invention.

Referring to the drawings, FIG. 1 is a plan view of a single rotor homopolar generator constructed in accordance with one embodiment of this invention. The generator includes a stator member 10, which surrounds a rotor 16 and has an opening 12 which defines an inner surface 14. A rotor 16 is concentrically positioned within the stator member and mounted for relative rotation therewith on bearings 18 and 20. A main stator winding coil including two winding sections 22 and 24, each being helically wound adjacent inner surface 14 and each being disposed around and coaxial with rotor 16, wherein winding sections 22 and 24 are electrically connected in series with each other through common connection point 26. The coil formed by winding sections 22 and 24 is wound so that flux produced in each section is in the same direction when current flows in the direction indicated by arrows I. A pair of brushes 28 and 30 are disposed circumferentially around and in sliding electrical contact with rotor 16, mounted on opposite side of the main stator winding, and electrically connected to opposite ends of the main stator winding by way of compensating conductors 32 and 34. The compensating winding formed by these conductors passes through opening 12. A third brush 36 is disposed in sliding electrical contact with rotor 16 and mounted at an intermediate position on the rotor between the first pair of brushes. Terminals 38 and 40 which are connected to the common connection point of the main stator winding and the third brush respectively, provide means for connecting an external load to the generator. Rotor 16 can be rotated by connection to an external driving means by way of shaft 42, or alternatively, by being electrically motored up to speed. To obtain the motor function, magnetic member 44 produces flux 48 within rotor 16 and brushes 28 and 36 are connected to an external power supply through terminals 50 and 52. Then the fields produced by winding sections 22 and 24 oppose each other since current flows in series through these sections. Magnetic member 44 may be a permanent magnet or an electromagnet energized by coil 54, or a combination of both.

Figure 2:
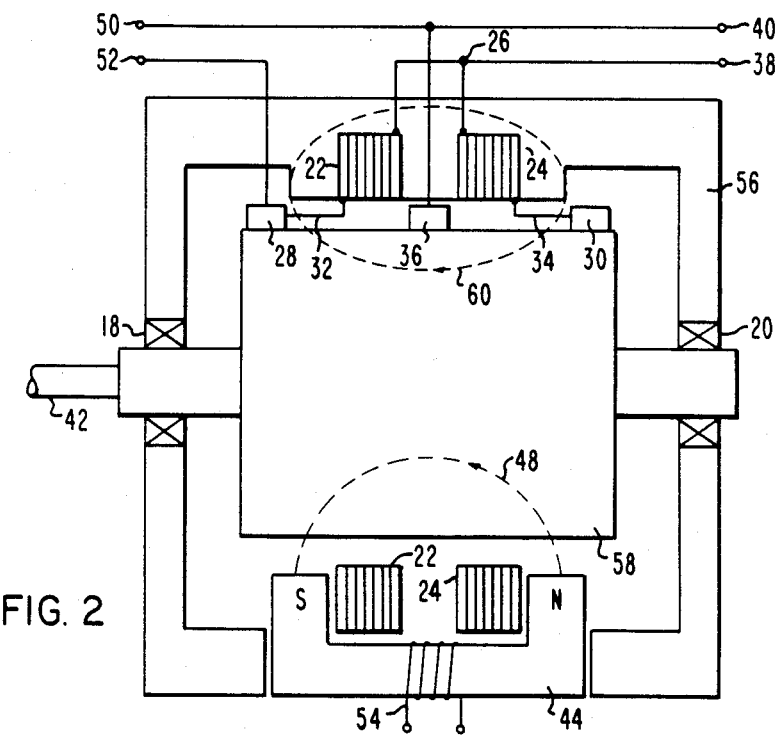
FIG. 2 is a plan view of an alternative embodiment of a homopolar generator constructed in accordance with this invention.

FIG. 2 is a plane view of an alternative embodiment of a single rotor homopolar generator constructed in accordance with the present invention. The generator of FIG. 2 is similar to the generator of FIG. 1 except that the stator element 56 has a different shape and the rotor 58 is cylindrical rather than tapered. In both FIGS. 1 and 2, brushes 28, 30 and 36 are arranged to make sliding electrical contact with the rotors and to allow current to flow through the rotor and through the series connected main field coils 22 and 24. The field coils are wound so as to increase magnetic flux 60 through the rotor when current is allowed to flow through an external circuit which is connected to terminals 38 and 40. When the rotors are rotated in the field, voltage is generated between the brushes. The magnetic member 44 is arranged to provide an initial magnetic flux to generate an initial voltage in the drum. The magnetic member may be sized to enhance the leakage flux of the series main field coil by decreasing the magnetic reluctance of the leakage field path. An external power supply can be connected to terminals 50 and 52 to provide DC current through the brushes and rotor and through the series field coil. By open circuiting terminals 38 and 40 and connecting terminals 50 and 52 to an external DC power source, it is possible to accelerate the rotor by motor action through the interaction of the supplied DC current and the residual magnetic flux from the magnetic member. Then, the electromagnetic flux in coil sections 22 and 24 oppose and no net flux is produced.

Figure 3:
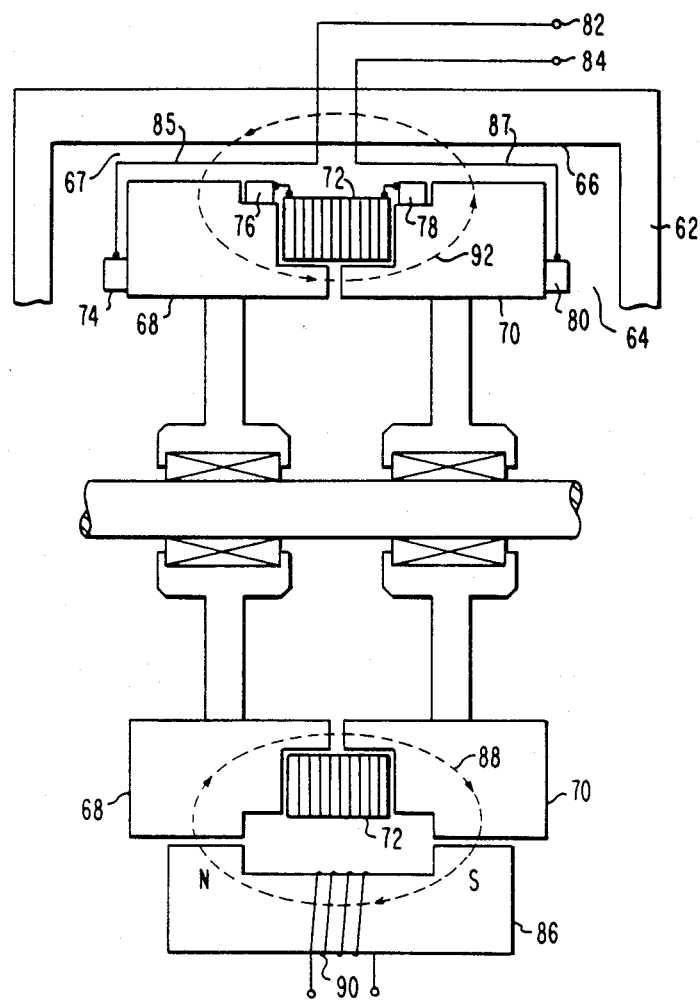
FIG. 3 is a plan view of a dual rotor homopolar generator constructed in accordance with this invention.

FIG. 3 is a plan view of a dual rotor homopolar generator in accordance with an alternative embodiment of this invention. A stator member 62 has an opening 64 which defines inner surface 66. An airgap space 67 is created between surface 66 and the periphery of the rotors. Rotors 68 and 70 are positioned within stator member 62 and mounted for rotation in opposite directions about a common axis relative to the stator member. A main stator winding 72 is helically wound adjacent inner surface 66 and coaxial with rotors 68 and 70. Brushes 74 and 76 are disposed circumferentially around and in sliding electrical contact with rotor 68 and mounted at axially displaced locations along the rotor, with brush 76 being connected to one end of main stator winding 72. Brushes 78 and 80 are disposed circumferentially around and in sliding electrical contact with rotor 70 and mounted at axially displaced locations along the rotor, with brush 78 being connected to the other end of main stator winding 72. An external load can be connected to brushes 74 and 80 by way of terminals 82 and 84. Connections between terminals 82 and 84 and brushes 74 and 80 respectively are made through compensating windings 85 and 87 which are located in the airgap 67. The rotors 68 and 70 can be rotated in opposite directions through connection to an external driving means, not shown. Magnetic member 86 provides initial flux 88 through rotors 68 and 70 such that motoring action occurs when terminals 82 and 84 are connected to an external DC power source. Magnetic member 86 may be a permanent magnet or an electromagnet driven by coil 90 or a combination of both.

When terminals 82 and 84 are connected to an external load and rotors 68 and 70 are rotating in opposite directions, the leakage field 92 of helical coil 72 passes through the rotors and causes a voltage to be induced in the rotors as they are rotated. Brushes 74, 76, 78 and 80 are arranged to make sliding contact with the rotors and to pick up the induced voltages. The brushes are connected in series with helical coil 72 and in series with a load through terminals 82 and 84. The connections to the coil are arranged such that when current is allowed to flow through the leads and the coil, the leakage field of the coil increases the voltage induced in the rotors. The brushes and interconnecting wiring can be arranged to surround the rotors to the extent necessary to reduce the current density in the brushes and to compensate the rotor current. Similarly, magnetic member 86 can be made to surround the rotors to any extent necessary to augment the leakage flux of coil 72 and thereby provide a self-exciting pulse generator.

Homopolar generators constructed in accordance with this invention can be constructed to provide a slow buildup of flux field and armature current, thus providing a controlled current buildup and an improved ratio of effective to peak current by proper design of the time constant of the series field coils. The time constant of the series field coils can be modified by the choice of ferromagnetic materials used to form the stator, the size of the airgap, the degree to which the stator is laminated, and the number of turns in the series field coil. The time constant can also be modified by intentionally inserting shorted turns which link with the magnetic field and adjusting the degree of coupling. By providing a permanent magnet or auxiliary pilot winding to augment initial residual flux, it is possible to minimize or eliminate the need for an external power supply. These homopolar generators will allow maximum use to be made of the material used in their construction and will result in a smaller weight to accomplish the function presently performed by separate components.

What is claimed is:

1. A high current DC electrical pulse generator comprising:
   a stator member;
   a rotor concentrically positioned within said stator and mounted for relative rotation therewith;
   a main stator winding including two winding sections each being helically wound around said rotor and each being coaxial with said rotor, wherein adjacent ends of said winding sections are electrically connected to a common connection point;
   a pair of brushes disposed in sliding contact with said rotor, mounted on opposite side of said main stator winding in an axial direction, and electrically connected to opposite ends of said main stator winding;
   a third brush disposed in sliding contact with said rotor and mounted at an intermediate position on said rotor between said first pair of brushes;
   means for connecting an external load between said third brush and said common connection point between said winding section such that said load is connected across two branch circuits, each comprising the series connection of one of said winding sections and a portion of said rotor extending between one of said pair of brushes and said third brush; and
   means for rotating said rotor.

2. A pusle generator as recited in claim 1, wherein said winding sections are wound to produce magnetic flux of the same polarity when said branch circuits are electrically connected in parallel and said flux increases the voltage induced in each of said rotor portions.

3. A pusle generator as recited in claim 1, wherein said means for rotating said rotor comprises:
   means for connecting said rotor to an external driving means.

4. A pulse generator as recited in claim 1, wherein said means for rotating said rotor comprises:
   means for producing magnetic flux which passes through said rotor; and
   means for connecting an external power source between one of said pair of brushes and said third brush.

5. A pulse generator as recited in claim 4, wherein said means for producing magnetic flux comprises:
   a magnetic member disposed adjacent said rotor.

6. A pulse generator as recited in claim 5, wherein said magnetic member is an electromagnet.

7. A pulse generator as recited in claim 5, wherein said magnetic member is a permanent magnet.

8. A pulse generator as recited in claim 1, wherein each of said brushes extends circumferentially around a portion of said motor.

9. A high current DC electric pulse generator comprising:
   a stator member;
   first and second rotors positioned within said stator member and mounted for rotation in opposite directions about a common axis relative to said stator member;
   a main stator winding being helically wound around said rotors and being coaxial with said rotors;
   first and second brushes disposed in sliding contact with said first rotor and mounted at axially displaced locations along said first rotor, wherein said second brush is connected to a first end of said main stator winding;
   third and fourth brushes disposed in sliding contact with said second rotor and mounted at axially displaced locations along said second rotor, wherein said third brush is connected to a second end of said main stator winding;
   means for connecting an external load between said first and fourth brushes wherein current flowing through said main stator winding produces magnetic flux which increases the voltage induced in said rotors; and
   means for rotating said first and second rotors.

10. A pulse generator as recited in claim 9, wherein said means for rotating said first and second rotors comprises:
    means for connecting said first and second rotors to an external driving means.

11. A pulse generator as recited in claim 9, wherein said means for rotating said first and second rotors comprises:
    means for producing magnetic flux which passes through said first and second rotors; and
    means for connecting said first and fourth brushes to an external DC power source.

12. A pulse generator as recited in claim 11, wherein said means for producing magnetic flux comprises:
    a magnetic member disposed adjacent to said first and second rotors.

13. A pulse generator as recited in claim 12, wherein magnetic member is an electromagnet.

14. A pulse generator as recited in claim 12, wherein said magnetic member is a permanent magnet.

15. A pulse generator as recited in claim 9, wherein said each of said brushes extends circumferentially around a portion of the rotor to which it makes sliding electrical contact.

* * * * *